US006984431B2

(12) United States Patent
Mass et al.

(10) Patent No.: US 6,984,431 B2
(45) Date of Patent: Jan. 10, 2006

(54) METHOD AND MATERIAL FOR MULTI-MATERIAL WRAPPING OF ITEMS AND A METHOD OF MAKING THE SAME

(75) Inventors: Nissim Mass, Kibbutz Mishmar HaEmek (IL); Zvi Paz, Kibbutz Mishmar HaEmek (IL); Uri Efrati, Kibbutz Mishmar HaEmek (IL); Ishai Doron, Kibbutz Mishmar HaEmek (IL); Dennis Anstey, Ottumwa, IA (US)

(73) Assignee: Tama Plastic Industry, Kibbutz Mishmar Ha'Emek (IL)

( * ) Notice: Subject to any disclaimer, the term of this patent is extended or adjusted under 35 U.S.C. 154(b) by 0 days.

(21) Appl. No.: 10/326,416

(22) Filed: Dec. 23, 2002

(65) Prior Publication Data

US 2004/0121108 A1    Jun. 24, 2004

(51) Int. Cl.
   *B32B 3/10*    (2006.01)
(52) U.S. Cl. .................... 428/54; 428/57; 428/58; 428/212; 206/83.5
(58) Field of Classification Search .................. 428/57, 428/58, 212, 54; 206/83.5; 52/3; 150/154
   See application file for complete search history.

(56) References Cited

U.S. PATENT DOCUMENTS

| 2,705,557 | A | 4/1955 | Hartman |
| 2,971,643 | A | 2/1961 | Farley |
| 3,647,061 | A | 3/1972 | Kaupin |
| 3,674,139 | A | 7/1972 | Manasian et al. |
| 4,366,665 | A | 1/1983 | VanGinhoven et al. |
| 4,557,958 | A | 12/1985 | Barkis et al. |
| 4,570,789 | A | 2/1986 | Fritz et al. |
| 4,703,605 | A | 11/1987 | Ackermann |
| 4,753,182 | A * | 6/1988 | Blackburn .................. 112/419 |
| 4,781,291 | A | 11/1988 | VanGinhoven |
| 4,917,008 | A | 4/1990 | van den Wildenberg |
| 4,929,303 | A | 5/1990 | Sheth |
| 4,956,968 | A | 9/1990 | Underhill |
| 5,349,806 | A | 9/1994 | Swearingen et al. |
| 5,415,924 | A | 5/1995 | Herlihy, Jr. |
| 5,747,134 | A * | 5/1998 | Mohammed et al. ......... 428/57 |
| 6,475,932 | B1 | 11/2002 | Stuczynski et al. |
| 6,521,551 | B1 | 2/2003 | Mass et al. |
| 6,606,843 | B1 | 8/2003 | Anstey et al. |
| 2004/0028847 | A1 * | 2/2004 | Teague et al. ............. 428/34.1 |

FOREIGN PATENT DOCUMENTS

| DE | 35 25 294 | 1/1987 |
| DE | 198 33 554 | 1/1999 |
| EP | 891698 A2 | 1/1999 |
| EP | 1321028 A1 | 6/2003 |
| WO | 90/08708 | 8/1990 |
| WO | WO 00/64237 | 11/2000 |

* cited by examiner

*Primary Examiner*—Alexander S. Thomas
(74) *Attorney, Agent, or Firm*—Morgan & Finnegan, LLP (57) ABSTRACT

Methods and material for securely wrapping items and providing protection against damage caused by the penetration of moisture or liquids. In particular, the methods and material of the present invention combine the advantages of multiple-material wrapping in a one-step wrapping process by joining the different wrapping segments at their edges to form a continuous wrapping material that can be utilized with existing wrapping technologies.

17 Claims, 10 Drawing Sheets

Prior Art

FIG. 1

Prior Art

METHOD AND MATERIAL FOR MULTI-MATERIAL WRAPPING OF ITEMS AND A METHOD OF MAKING THE SAME

FIELD OF THE INVENTION

The present invention relates to a method and material for securely wrapping items and providing protection against damage caused by the penetration of liquids or moisture. Additionally, the present invention relates to wrapping materials and methods of their manufacture, which facilitate their use as wrapping material for items. The wrapping material of the present invention is formed from segments of different materials that are assembled in the longitudinal and/or lateral direction to provide a continuous wrap that has the advantages of being formed from different types of material and permits its use in a single one-step wrapping process with existing wrapping technologies.

BACKGROUND OF THE INVENTION

Generally, items to be wrapped must be wrapped with a material that will be strong enough to hold the item from falling apart but also prevent liquids or moisture from penetrating the item, which could cause permanent damage. For all types of wrapping applications, the wrapping material is required to have the following basic characteristics: 1) it must hold the wrapped item securely and prevent liquids or moisture, such as rain, from penetrating the wrapped item; 2) it must be feedable into a wrapping machine without sticking to the pulling rolls along the wrapping material's path; and 3) it must hold or adhere to the item to be wrapped and also adhere to the wrapping material directly beneath it, if necessary.

There are a number of materials that have been proposed for wrapping items, but all have drawbacks. For example, netting materials have many advantages with regard to strength and the ease of use, but cannot prevent penetration of liquids. On the other hand, wrapping film effectively protects against moisture but is required to have adhesive qualities, and such a film has difficulty being fed into existing wrapping machines, for example, round balers manufactured for wrapping with netting. Moreover, wrapping material formed from existing laminate combinations of netting with cling film also experience problems when used with existing wrapping machines because the laminate cannot be successfully fed into these machines because of the characteristics of the cling film.

In order to avoid this problem, complicated and expensive devices have been built to enable the wrapping of items with these types of wrapping materials. The following prior art references give examples of existing wrapping techniques used for baled items. U.S. Pat. No. 4,366,665, U.S. Pat. No. 4,956,968 and International Patent Application Patent No. WO 00/64237 disclose a baler with an apparatus for supplying plastic film to a completed bale. However, none of these references disclose a wrapping method or material that combines the advantages of wrapping with different types of material in a single wrapping process.

U.S. Pat. No. 4,703,605 discloses a method of baling using different wrapping materials. The wrapping material includes a shape retaining wrapping web that completely surrounds the circumference of the bale, and a water impermeable wrapping material extending over a portion of the circumference of the bale. The water-impermeable material includes a foil material that is introduced into the wrapping process so as to cover predetermined portions on the top and bottom of the bale. The portion at the top protects the bale from rain, and the portion at the bottom protects the bale from moisture on the ground. Although this wrapping process attempts to take advantage of using different materials to wrap a bale, it fails to provide a continuous wrapping material composed of multi-material segments that can be easily applied to existing wrapping technologies.

Figure 1:
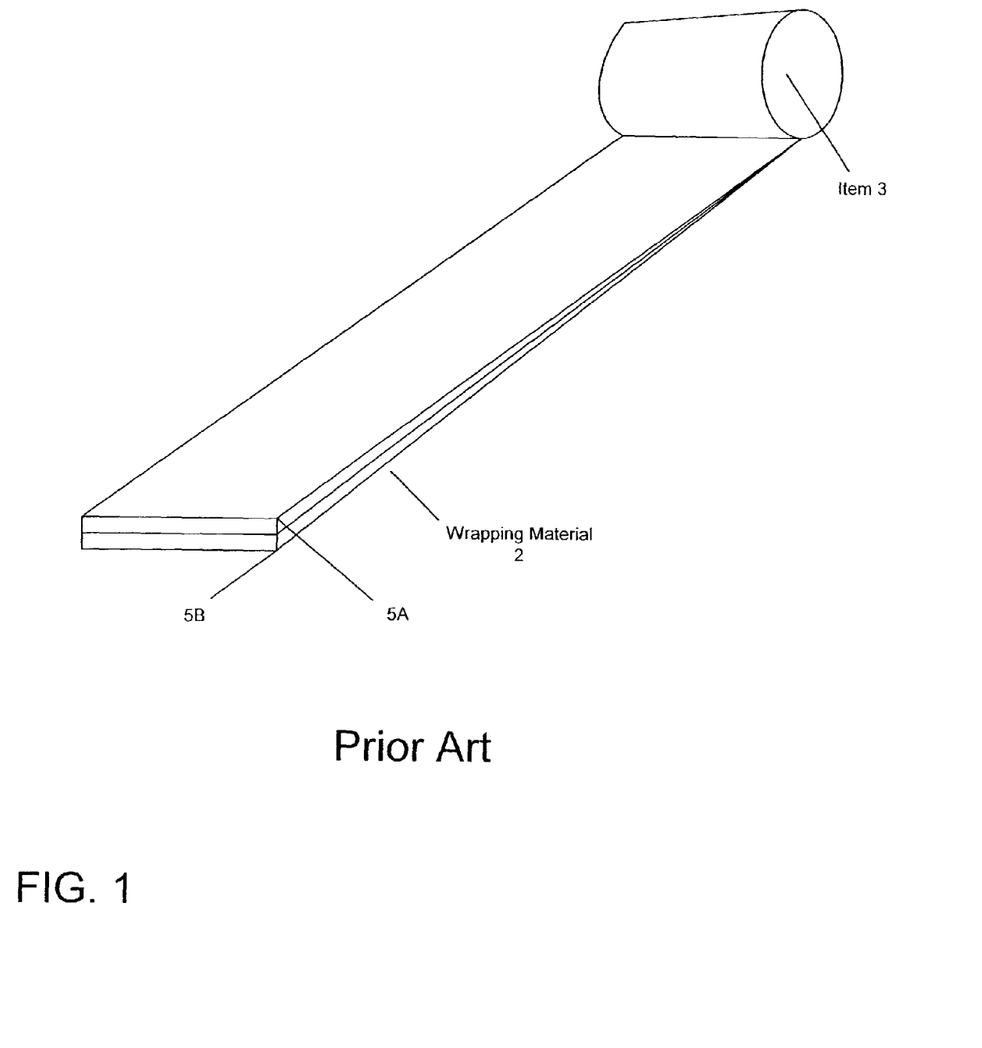
FIG. 1 is a perspective illustration of a "Prior Art" wrapping material used for wrapping an item.
Figure 2:
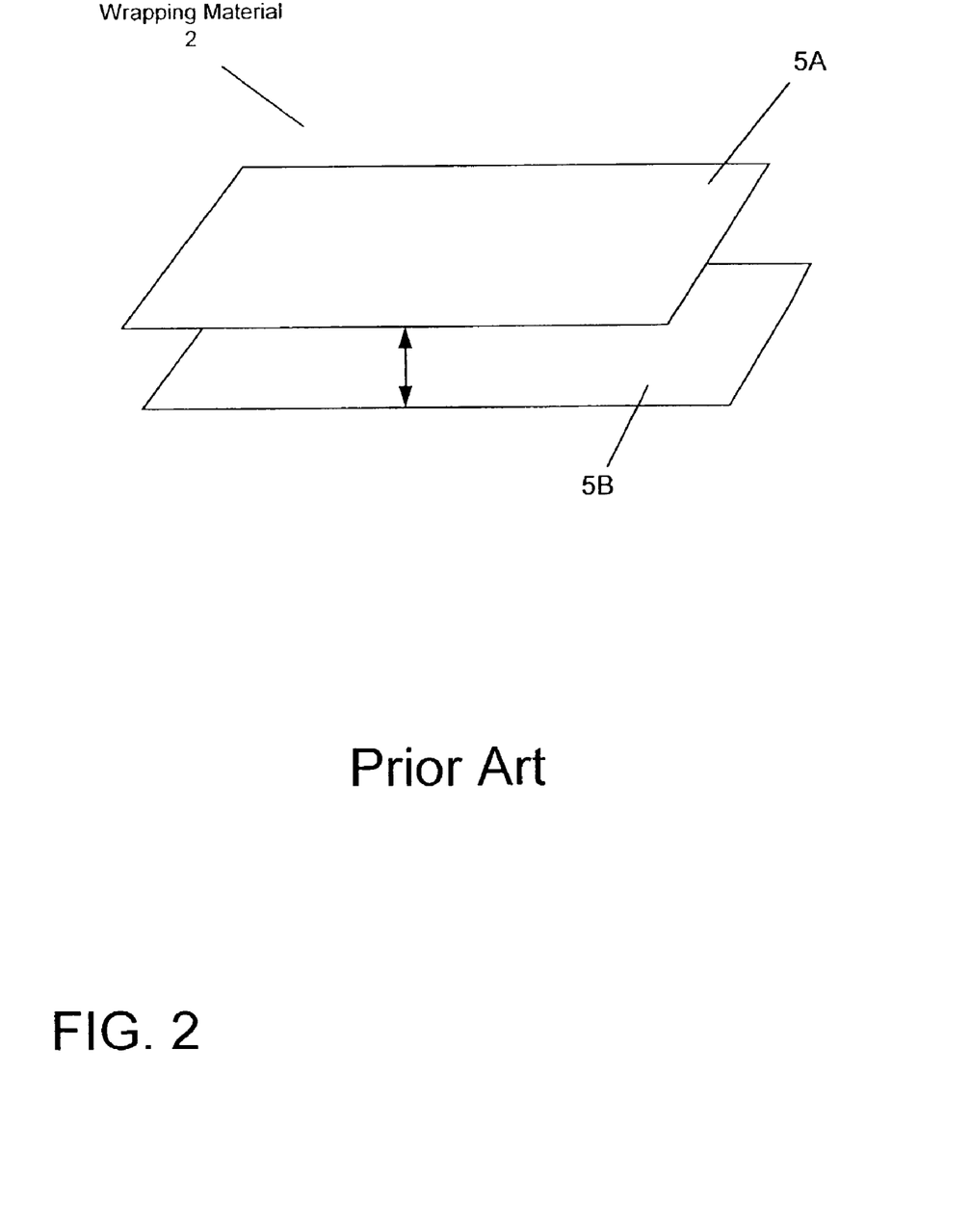
FIG. 2 is a more detailed illustration of the layers of the "Prior Art" wrapping material used for wrapping an item.

Examples of "Prior Art" wrapping are shown in FIGS. 1 and 2. FIG. 1 illustrates a prior art wrapping material 2 used to wrap an item 3. The prior art wrapping material includes two layers 5A, 5B of different material types that are joined together to form a laminate. For example, for baling items such as hay, the first layer 5A would typically be a netting material that would hold the bale together and the second layer 5B would be a plastic wrap used as a moisture barrier to protect the baled hay from moisture damage. If the baled item were cotton, the first layer 5A may be a non-cling film instead of a netting material. However, regardless of the application, the layers 5A, 5B would typically be combined as a laminate material prior to or during the wrapping process using a different wrapping apparatus. Thus, the prior art processes requires extensive modification to existing baling machinery, such as the installation of special devices to enable use of cling film. For example, a hay baler that works with only netting would have to be modified to a baler that also works with cling film, or in the alternative an entire new system would have to be built to work in conjunction with an existing hay baler. However, progress has been slow because of the difficulty in matching the netting and film using different wrapping devices during the wrapping process.

FIG. 2 is a more detailed illustration of the different layers of the prior art wrapping material previously mentioned and a method of making the wrapping material. The prior art wrapping material 5 includes two layers 5A and 5B that are combined during the material's manufacturing process as a laminate as shown in FIG. 2. When used as a laminate, the first layer 5A is attached to the second layer 5B using a method of bonding known in the art. For example, by using a permanent adhesive the layers are bonded/adhered to each other with or without the application of heat. Alternatively, pressure can be applied to the layers during manufacture, which will bond layers 5A, 5B to one another. Thus, during the wrapping process the layers of the laminate are wrapped around the circumference of the item simultaneously as a single sheet of wrapping material. However, whenever there are two elements so bonded together (i.e., as a co-extensive laminate) that are not identical in their characteristics, the resulting combination will include the negative qualities of each of the materials used. For example, if film has a greater tendency than netting to narrow ("shrinkage"), then when the film shrinks it will also cause the attached netting to shrink as well.

SUMMARY OF THE INVENTION

With the foregoing in mind, the material and methods of the present invention provide a wrapping material that takes advantage of using different types of wrapping segments but can also be implemented using existing wrapping technologies. Specifically, the wrapping material of the present invention is comprised of different wrapping segments joined to each other at their respective ends to form a continuous wrapping material. Because the wrapping segments are joined so as to form a continuous wrapping material, the wrapping material can be conveniently used with existing wrapping technologies.

In accordance with the invention and by way of example, a wrapping cycle will start with netting or with non-cling film so that the wrapping material can be fed into unmodified net wrapping machinery (such as existing balers and pallet wrapping machines). The netting is joined in a continuum with a cling film so that as the item is wrapped the cling film will finish the wrapping process upon the completion the first wrapping cycle. Accordingly, the next item would be wrapped initially by the next segment of the wrapping material, which would again begin with netting or non-cling film and finish with the cling film upon the completion of the second wrapping cycle. It is contemplated by the invention that the term cling describes the adhering nature of a wrapping material with or without the use of a bonding agent. Thus, the term cling may include, but is not limited to, wrapping materials that would be described as tacky, sticky, adhesive, or the like.

In accordance with a further aspect of the invention, the wrapping material includes joining a plurality of different types of wrapping segments in the widthwise direction.

In accordance with a further aspect of the invention, the wrapping material includes joining a plurality of different types of wrapping segments in the lengthwise direction without the wrapping material being divided into wrapping portions.

In accordance with a further aspect of the invention, the wrapping material includes the use of a laminate segment instead of a netting segment.

In accordance with a further aspect of the invention, the wrapping material will be comprised of different wrapping segments whose ends are overlapped and joined to one another to form a continuous wrapping material.

In accordance with a further aspect of the invention, the wrapping material includes the use of a breathable film segment joined to a netting segment. It is contemplated by the invention that the breathable film is used for wrapping the entire circumference of an item and is not covered by another layer of wrapping material. Accordingly, the breathable film segment allows water vapor to escape from the wrapped item while preventing condensation and moisture from penetrating.

In accordance with a further aspect of the invention, the wrapping material will be comprised of different wrapping segments whose ends are joined to one another to form different wrapping portions.

In accordance with a further aspect of the invention, at least one sensor is used to detect the end of a wrapping cycle.

In accordance with a further aspect of the invention, a method of wrapping an item with a plurality of different material segments joined at their lateral or widthwise ends and in a continuum to form continuous wrapping portions.

In accordance with a further aspect of the invention, a method of wrapping an item includes the use of a plurality of different material segments joined at their longitudinal or lengthwise ends and in a continuum to form a continuous wrapping material.

In accordance with a further aspect of the invention, the method also includes determining the end of a wrapping cycle and completing the wrapping process.

DETAILED DESCRIPTION OF THE INVENTION

The invention will now be discussed with reference to FIGS. 3–11, and the corresponding non-limiting examples. Like reference numbers and designations in these figures refer to like elements.

Figure 3:
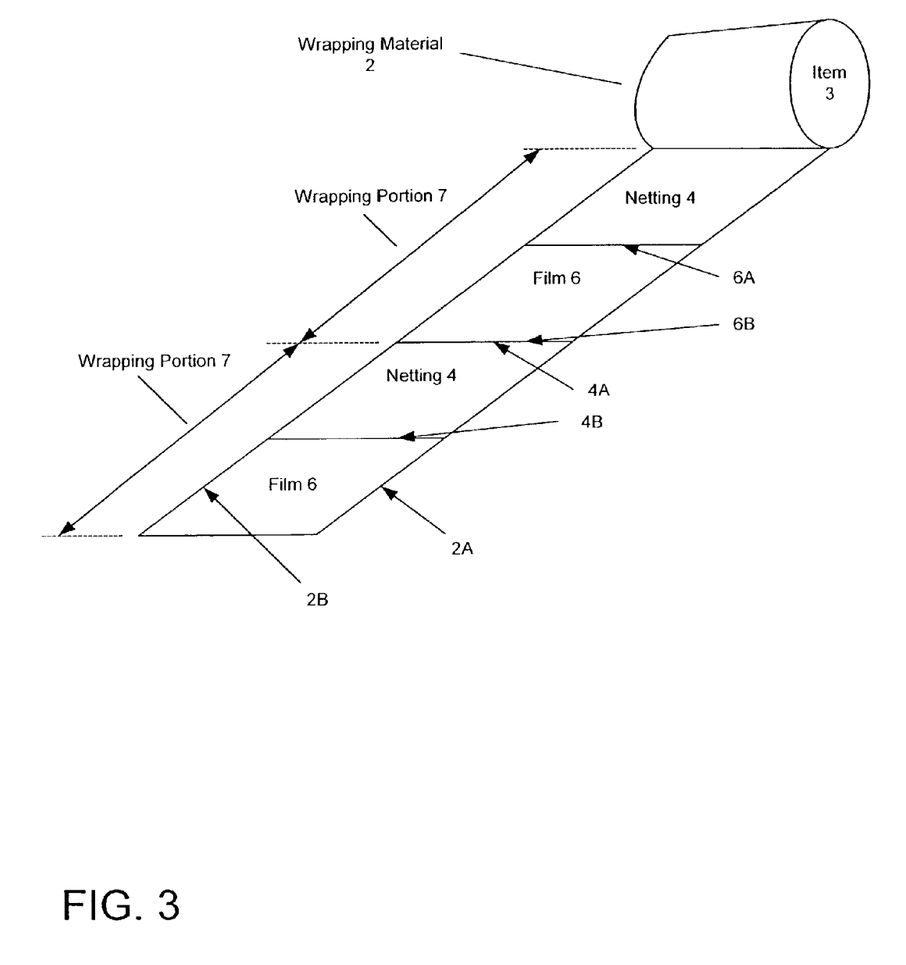
FIG. 3 is a perspective illustration of wrapping material for an item in accordance with an embodiment of the present invention.

FIG. 3 is a perspective illustration of the wrapping material in accordance with an embodiment of the present invention. The wrapping material 2 has lengthwise edges 2A and 2B, and is formed from a plurality of positioned segments 4 (netting), 6 (film) made from different materials. Each of the segments 4, 6 have widthwise attachment edges 4A, 4B, 6A, 6B for joining the segments 4, 6 to each other. The segments 4, 6 are joined to one another by, for example, adhering a film edge 6B to a netting edge 4A in an end-to-end fashion to form a continuous film/netting wrapping material 2. The netting segment 4 and film segment 6 are joined near their respective ends to form a wrapping portion 7.

The netting 4 and the film 6 are preferably made from a polyolefin or other synthetic resin, such as polyethylene or polypropylene, that is approximately 40 microns thick and 1.25 meters in width. The total length of a wrapping portion 7, which consists of segments 4, 6, should be at least long enough to cover the circumference "C" of the wrapped item 3. However, the length, width and thickness of each segment can vary depending on the size and shape of the item to be wrapped, or the wrapping application. For example, the lengths of each segment 4, 6 can range from 5% to 300% of the circumference "C" of the item. Additionally, the film used can also include, but is not limited to, a breathable film. It is contemplated by the invention that if breathable film is used for wrapping, it will wrap the entire circumference of an item and not be covered by another layer of wrapping material. More specifically, when the breathable film is combined with a netting segment, the item will be initially wrapped with the netting segment and finished with the breathable film. Accordingly, the item is securely held by the netting segment and the breathable film segment allows water vapor to escape while preventing condensation and moisture from penetrating the item inside. To this end, the present invention is not limited to these materials or to the dimensions mentioned above. The material-type and dimensions of the wrapping material can be made to fit a particular wrapping application or item to be wrapped. Additionally, applications for the wrapping material include, but are not limited to, wrapping pallets, hay, straw, cotton, silage and garbage.

By way of example, the wrapping can be carried out on an agricultural baler known in the art for baling hay, straw or other agricultural crops. For example, when the bale comes to its full diameter, the wrapping cycle will start with the netting segment 4. The netting segment 4 will be fed into the baler, and the wrapping process will continue with the film segment 6 being wrapped approximately 1¼ turns around the item 3 to be wrapped. Although other degrees of wrapping the film are contemplated, the film segment 6 should be enough to at least cover the circumference "C" of the item 3. The film segment 6 is a one-side cling film that will adhere to the netting segment 4 or to itself during the wrapping process of the item 3.

Additionally, the cling side of the film segment 6 will seal the netting segment 4 to protect the item 3 from the outside environment during the same wrapping cycle. To this end, the method and material of the present invention takes advantage of the benefits of using both film and netting while avoiding the drawbacks noted in the prior art. The wrapping material of the present invention can be fed into unmodified net wrapping machinery because the cycle starts with the netting segment 4, which easily feeds into existing wrapping machines, and finishes with the film segment 6.

As an alternative to segment 4 being netting, the first turn or segment 4 can also be formed from other types of non-cling material, such as a non-cling film. Additionally, it should be emphasized that the present invention is not limited only to specific material or specific dimensions, and has applications for preparation of all wrapping material, taking into consideration the desirable qualities of each material and the purposes for which the items are being wrapped.

Figure 4:
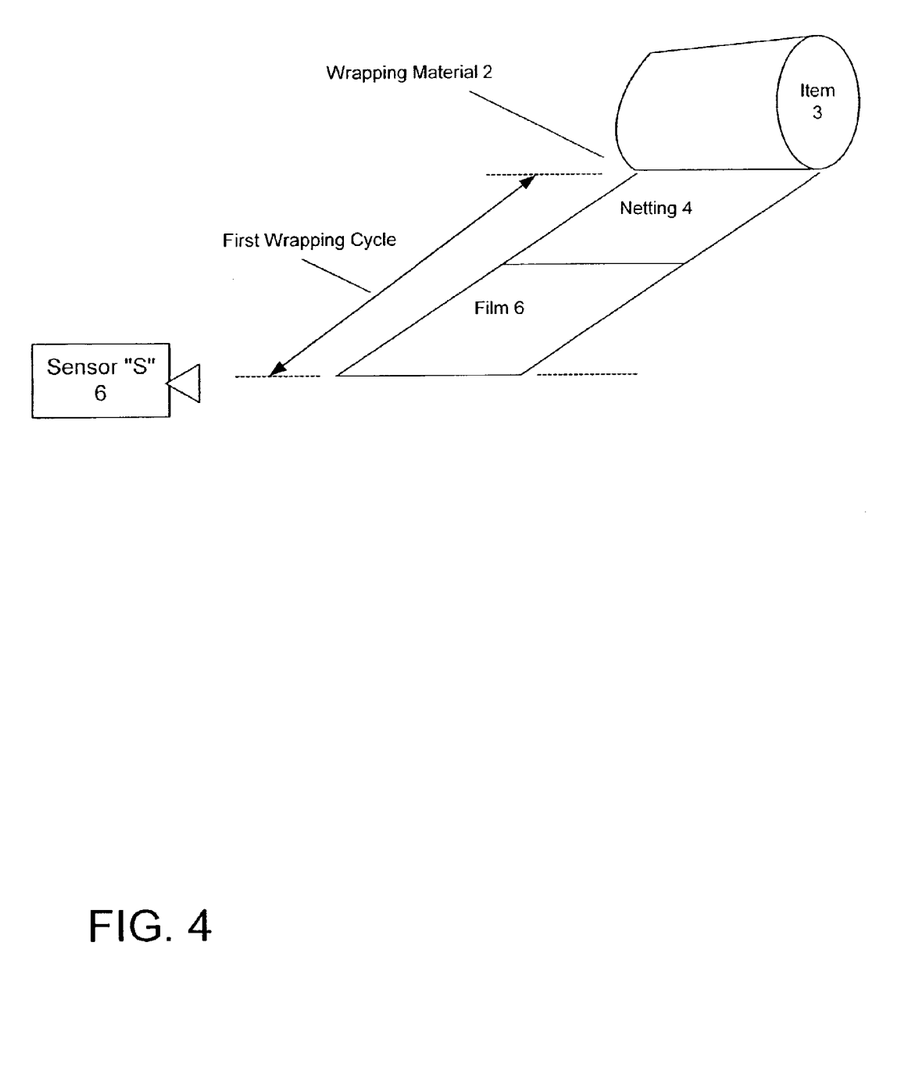
FIG. 4 is a perspective illustration of wrapping material and a sensor in accordance with a method of the present invention.

FIG. 4 illustrates the method of detecting the end of a wrapping cycle. Specifically, a sensor "S" or any other detecting technique is used to detect the end of a wrapping (film) segment 6, which is the end of the first wrapping cycle. The function of the sensor is to stop the feeding of the wrapping material when the end of a wrapping cycle is detected. When the end of a wrapping cycle is detected the wrapping material 2 can either be torn or separated where the netting film segment 6 of the first wrapping cycle meets the netting segment 4 at the beginning of the second wrapping cycle. The tearing-off of the material is achieved by the combination of the stopping the wrapping cycle and the use of perforations (not shown) in the width direction of the wrapping material, or by the use of a weaker adhesion between two segments or by any alternative tearing technique, either in addition to or instead of perforations. Alternatively, existing knifes used in prior art wrapping machines can be used to cut the wrapping material 2 at the end of a wrapping cycle. The only addition or modification to the existing prior art machinery is the installation of a sensor (not shown) that tells the knife when and where to cut the wrapping material 2.

Figure 5:
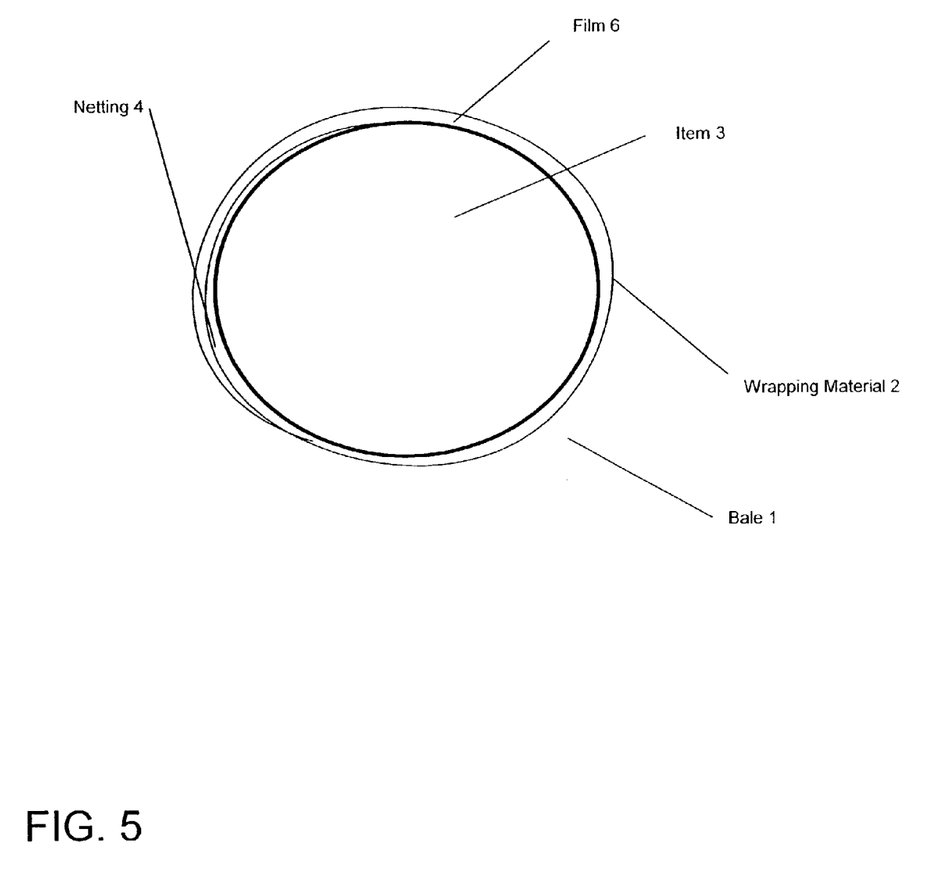
FIG. 5 is a cross-sectional view of the layers of a wrapped item in accordance with an embodiment of the present invention.

FIG. 5 is a cross-sectional view of the wrapping material 2 of FIG. 4 covering item 3 at the end of a wrapping cycle. When a wrapping cycle is completed, the item 3 will have two layers of wrapping material 2. The first layer is the netting segment 4 that holds the item 3 in the desired shape, and the second film layer 6 is a film that seals the material 3 from the outside elements. Because the wrapping cycle started with the netting segment 4, the netting segment 4 is covered by the film segment 6 thereby taking advantage of both film and netting materials without requiring major modification to existing wrapping devices. However, the first layer of the wrapping material 2 is not limited to the use of a netting material and can also be formed from other types of non-cling material, such as a non-cling film. Additionally, the second layer of the wrapping material 2 can include the use of a breathable film.

Figure 6:
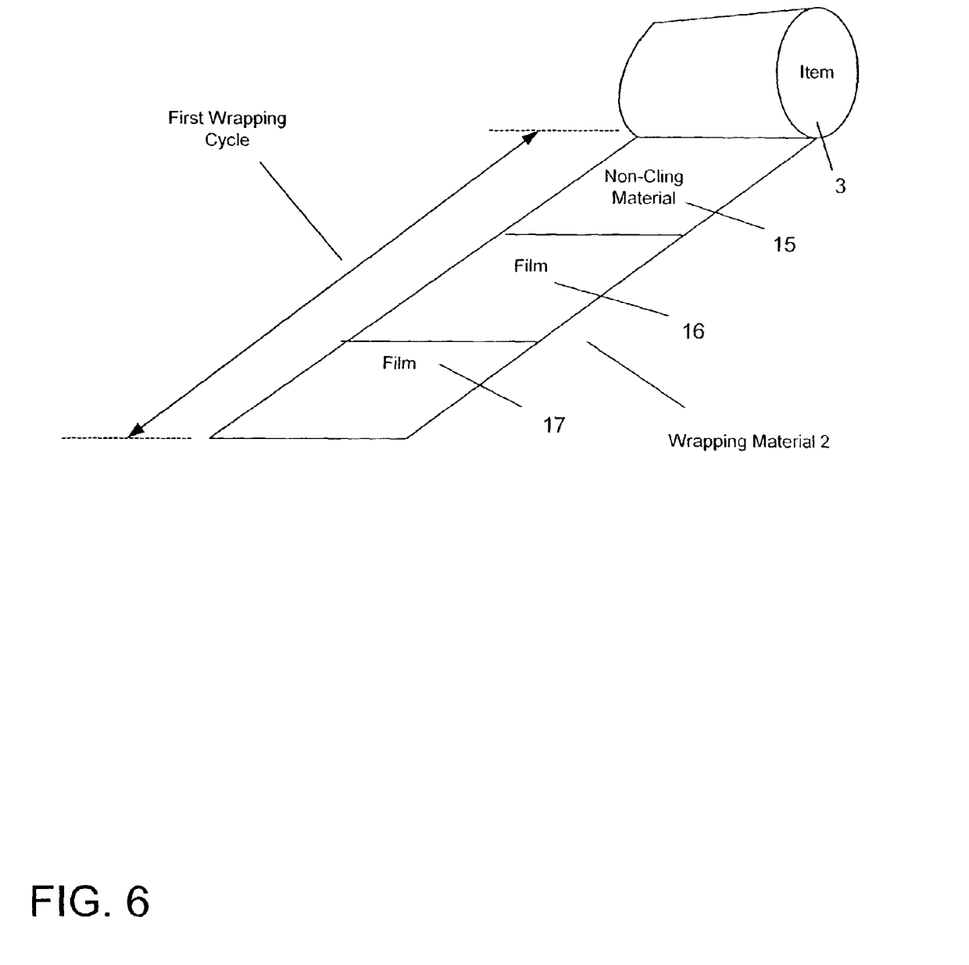
FIG. 6 is perspective illustration of wrapping material in accordance with an embodiment of the present invention.

FIG. 6 is a perspective illustration of another embodiment of the wrapping material in accordance with the present invention. In FIG. 6, the item 3 is wrapped using a wrapping material 2 that differs from the embodiment of FIG. 4 in that the netting segment 4 is replaced with a non-cling segment 15 and an additional wrapping film segment 17 is added. Since wrapping bales of cotton with netting is considered problematic today, the wrapping material 2 includes the use of a non-cling segment 15, such as a laminate material. If the non-cling segment 15 is a laminate, it may be comprised of different kinds of film in combination with netting. For example, the non-cling segment 15 may be a combination of film/netting/film (or any other non-cling material) material that results in a total thickness of about 60–80 microns and allows feeding to start with an unmodified wrapping device or machine. However, the first layer 15 of the wrapping material 2 is not limited to the use of a laminate and can also be formed from other types of non-cling material, such as a non-cling film. Additionally, the last wrapping segment 17 may include the use of a breathable film segment.

In FIG. 6, the wrapping cycle will start with the non-cling segment 15, which is wrapped around the item 3. The non-cling segment 15 can either be a short segment that does not cover the entire circumference of the item 3, or a longer segment that covers at least the entire circumference. Additionally, it is contemplated by the invention that the term "non-cling" includes netting material, non-cling film, laminate material or any other type of non-cling material. The next wrapping segment 16 of the wrapping material 2 is a film that has a cling surface on at least one surface and is wrapped around at least a part of the item 3. The final wrapping segment in the wrapping cycle is a film 17 that is wrapped around at least a part of the item 3 and also has a cling surface on at least one side, so that there is adhesion between the two cling surfaces of the films. Specifically, the cling surface of the segment 16 faces outward away from the item 3 being wrapped, while the cling surface of segment 17 faces inward toward the item 3. In this way, the wrapping segment 16 does not adhere to the item 3 being wrapped and, instead, will adhere to the cling surface of the last wrapping segment 17. The cling surfaces of the wrapping segments 16, 17 can be made from different adhesive materials such that improved bonding occurs through a chemical reaction between the different wrapping segments. The lengths of segments 15, 16 and 17 can be respectively, and independently of each other, the same or different, and can range between 5% and 300% of the circumference "C" of the item 3 being wrapped.

As another alternative to this embodiment, the non-cling segment 15 can be followed by a single segment of film 16 with a cling surface on the inner side facing toward the item 3.

Figure 7:
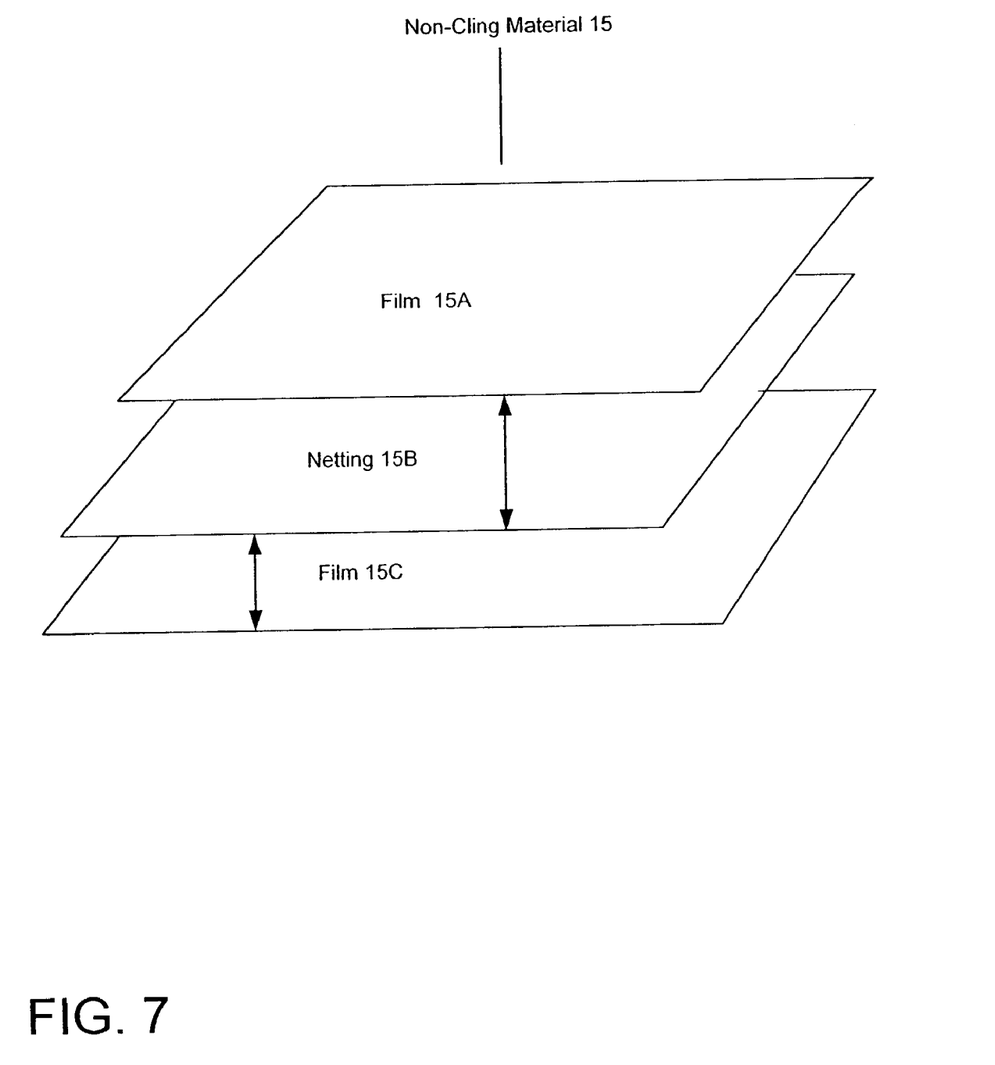
FIG. 7 is more detailed illustration of the non-cling segment of the wrapping material in accordance with an embodiment of the present invention.

FIG. 7 is a detailed illustration of the different layers of the non-cling segment 15 in accordance with an embodiment of the invention. The non-cling segment 15 is comprised of three layers 15A, 15B, 15C that are adhered to each other to form a single wrapping segment 15 of the wrapping material 2. Two of the film layers 15A, 15C have one surface that is a cling surface so as to adhere to the netting layer 15B that is sandwiched in the middle. For example, the first and second films 15A, 15C have a cling inner surface (not shown). However, the outer surface of the first and second films 15A and 15C are non-cling so that the segment 15 can be easily used with existing wrapping equipment without binding. The layers 15A, 15B of the non-cling segment 15 are made from a polyethylene or other synthetic resin that is approximately 40 microns thick and approximately 1.25 meters wide. The layer of netting 15B is 12 grams per meter and is approximately 1.2 meters wide and placed between the two layers of film. However, the length, width, weight and thickness of the segment 15 can vary depending on the size and shape of the item to be wrapped, and the wrapping application. The adhesion of one material to another to make a composite wrapping material is accomplished with or without the use of adhesives. For example, adhesion may be accomplished by increasing the pressure and/or heating during manufacturing thereby utilizing the characteristics of the film.

Figure 8:
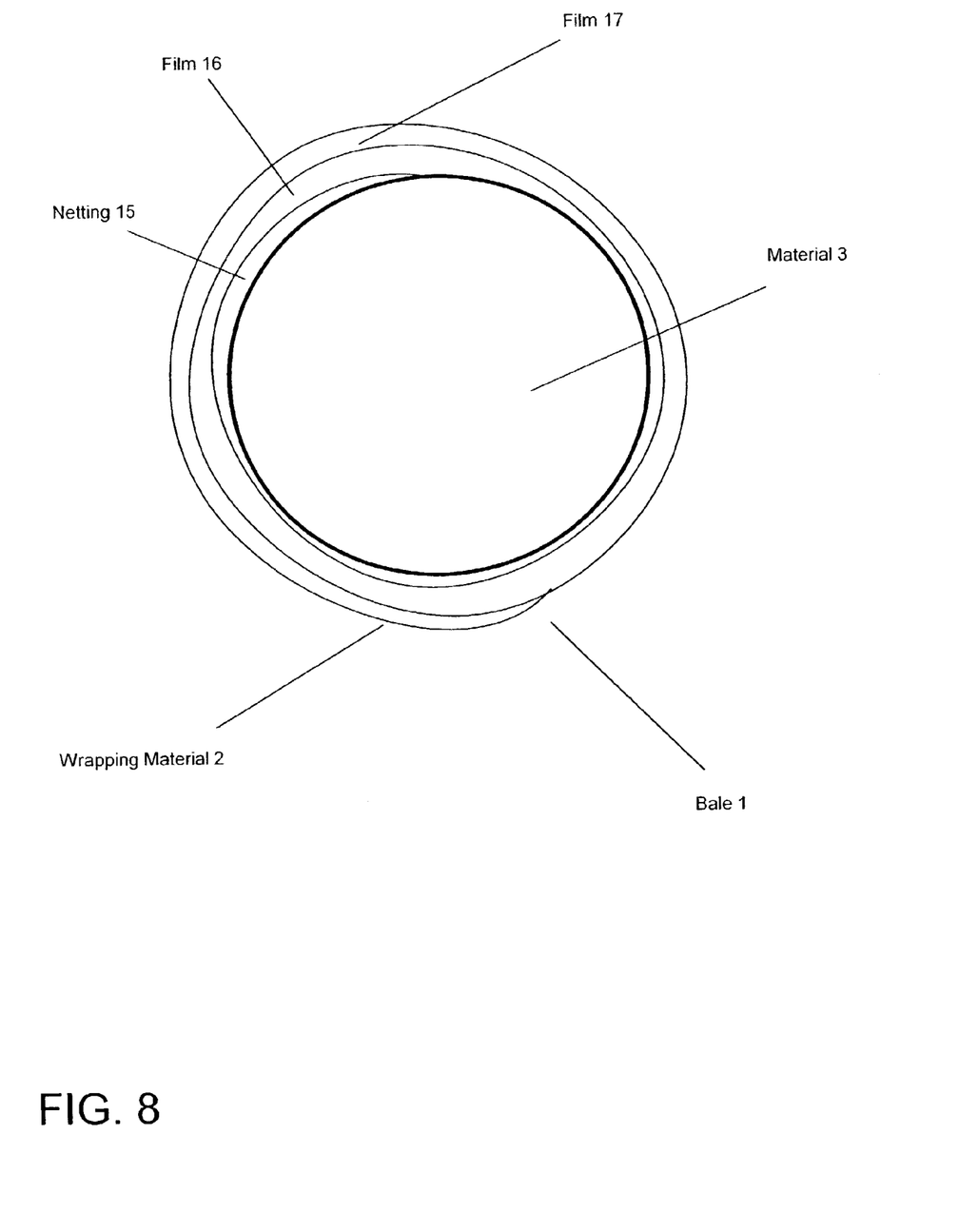
FIG. 8 is a cross-sectional view of the different layers of a wrapped item in accordance with an embodiment of the present invention.

FIG. 8 is a cross-sectional view of the wrapping material 2 of FIG. 7 covering the item 3 at the end of a wrapping cycle. When a wrapping cycle is completed, the item 3 will have three layers of wrapping material 2 that includes the non-cling segment 15 and two film segments 16, 17. In FIG. 8, because the wrapping cycle starts with the non-cling segment 15, the segment 15 is directly in contact with the item 3 and is covered and in direct contact with the first film segment 16. The second film segment 17 covers the first film segment 16 to complete the wrapping cycle. Using the wrapping material of the present invention, the wrapping of items can be achieved utilizing existing wrapping technologies. As mentioned previously, the first layer of the wrapping material 2 is not limited to a laminate material and can also be formed from other types of non-cling material, such as a non-cling film or netting material.

Figure 9:
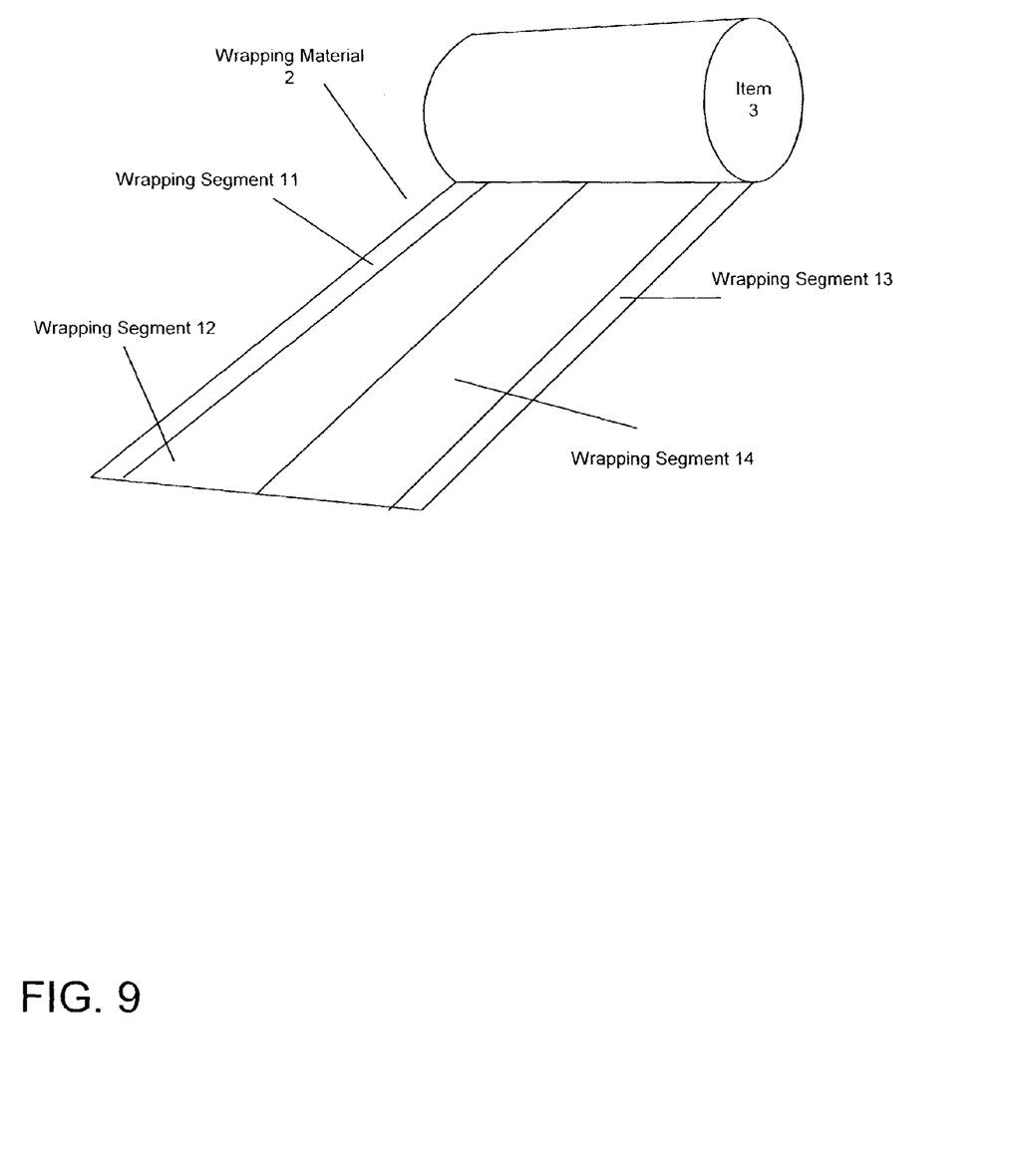
FIG. 9 is a perspective illustration of the wrapping material for an item in accordance with an embodiment of the present invention.

FIG. 9 is a perspective illustration of another embodiment contemplated by the present invention. Specifically, the wrapping segments 11, 12, 13, 14 that make up the wrapping material 2 vary in the lengthwise or longitudinal direction, as opposed to the lateral direction as illustrated in FIG. 3. As seen in FIG. 9, wrapping segments 11, 12, 13 and 14 are attached longitudinally (i.e. side-by-side) forming a continuous sheet of wrapping material. This type of wrapping material 20 is useful in wrapping applications where different parts of the item 3 have different wrapping requirements. The present invention can offer a solution for cases where the material used for wrapping is made up of different material types and thickness along its width. For example, a high tensile strength non-cling film, netting or cling film can be used for wrapping the item 3 at its ends and in a continuum, while a wider stretch film can be used in order to cover the remaining part of the item 3. Using this wrapping material, each wrapping segment 11, 12, 13, 14 is simultaneously wrapped around the bale during a single wrapping cycle. The wrapping material 2 can be utilized as a continuous material that is not divided into wrapping portions and is cut by a wrapping machine or other packing machine at the end of a particular wrapping operation.

Figure 10:
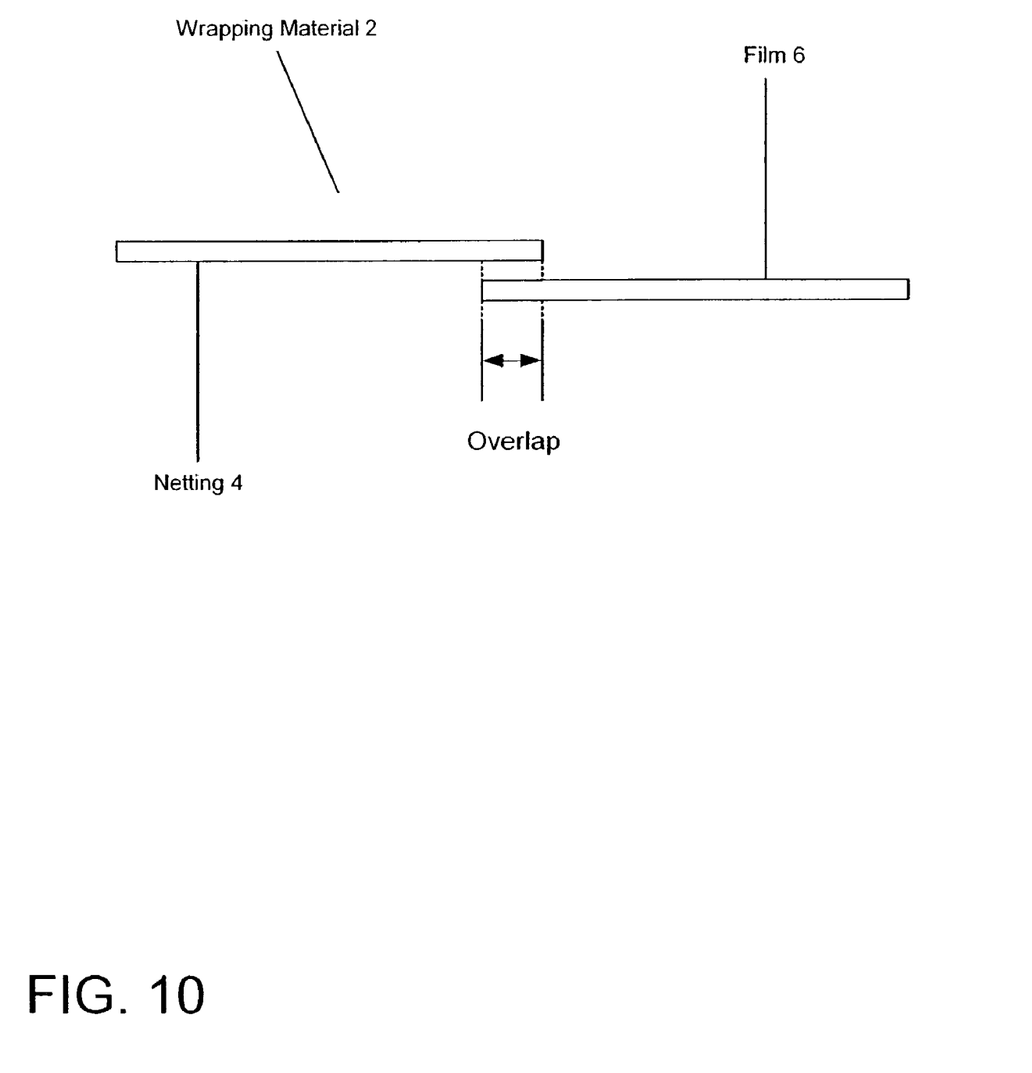
FIG. 10 is a perspective illustration of the attaching the different wrapping segments in accordance with a method of the present invention.

FIG. 10 is a side view of the method of making the wrapping material 2. Continuity of material is achieved by adhering wrapping segments 4, 6 together using an overlap between the segments 4, 6. The overlap between the two wrapping segments 4, 6 can be increased or decreased based on the wrapping application. Additionally, the netting 4 segment and film segment 6 can also be joined without any adhesive being necessary by using increased pressure during manufacturing because the characteristics of the film will result in adequate bonding. Additionally, the first layer of the wrapping material 2 is not limited to a netting material and can also be formed from other types of non-cling material, such as a non-cling film.

The following are examples of experiments conducted using the wrapping material of the present invention. However, the wrapping material of the present invention is in no way limited to the data used in the following examples. The data can be changed to reflect the different dimensions of items being wrapped or the characteristics of the different wrapping materials used for a specific wrapping application.

EXAMPLES

Experiment 1

Five wrapping material samples were prepared for respectively wrapping 5 bales of straw that were 1.2 m in diameter and 48" (1.22 m) wide. Each sample included a length of laminate and a length of cling film. Examples 1–5 are described below, as follows:

| Examples | Laminate Length | Cling Film Length | Wrapping[1] | Feed Results[2] | End Cling[3] |
|---|---|---|---|---|---|
| 1 | 5 m[4] | 5 m | Y | NP | P |
| 2 | 6 m | 6 m | Y | NP | P |
| 3 | 6 m | 5 m | Y | NP | P |
| 4 | 5 m | 6 m | Y | NP | P |
| 5 | 5 m | 7 m | Y | NP | P |

[1]Wrapping acceptable - Y (yes) or N (no)
[2]Feed condition - Problem free - NP or Problematic - P
[3]End cling - Problem free - NP or Problematic - P
[4]"m" corresponds to meters The criterion for examining the end cling was the presence of the bale in the field for a period of three months without unwrapping the bale. The laminate was made from two LDPE polymer films, each 40 μm thick, with an intermediate Raschel netting layer weighing 12 gm/m and 1.2 m wide. The cling film was a standard cling film made of LLDPE with an addition of two sticky tapes at the ends. The cling film was 30 μm thick with a width of 1.26 m. Additionally, the film (2.8 m width) had an elongation at break of about 130%, and a force created when stretching 20% that approached about 140 kg.

The test results demonstrate that a wrapping material made in accordance with the present invention had satisfactory feed and wrapping properties. The quality of the cling end attachment could be improved, e.g., is somewhat problematic, but no more so than existing wrapped bales. Additionally, the addition of the double sided tape to the end of every wrapping segment improved adhesive characteristics of the ends of the wrapping material over the prior art wrapping materials.

Experiment 2

Two bales of hay were each wrapped with a wrapping material having alternating netting and cling film material segments. The lengths of the netting and film segments were 2.5 meters. The weight of the film was about 23 g/m$^2$ and the thickness was about 28 microns. Feeding and wrapping of the bales of hay with this material were acceptable and end attachment was not problem free.

Experiment 3

Two bales of hay were wrapped with a wrapping material with alternating netting and cling film segments, each of which was 7 m in length. The ends of the cling film segment included four laterally positioned strips of tape, each 20 cm in length. The strips of tape had high adhesiveness. Feeding and wrapping of the bale of hay with this material were acceptable and end attachment was not problem free.

Experiment 4

Two bales of cotton were wrapped with a wrapping material with alternating laminate and cling film segments, each of which was 7 m in length. The ends of the cling film segments included four laterally positioned strips of double-sided tape, each 20 cm in length. The strips of tape had high adhesiveness. Feeding and wrapping of the cotton bales with this material were acceptable and end attachment was not problem free.

Experiment 5

A bale of cotton was wrapped with a wrapping material having three discrete segments: (1) a first laminate segment one (1) m in length, (2) a second cling film segment 6 m length, with an outer cling surface, (3) a third cling film segment 3.5 m length having an inner cling surface, such that an inner edge surface end of the third segment contacts the outer cling surface of the second cling film segment, with alternating laminate and cling film segments, each of which was 7 m in length. Feeding and wrapping of the cotton bale with this material were acceptable and end attachment was substantially problem free.

It should be emphasized that wrapping material of the present invention is not limited only to specific material or specific dimensions, and has applications for preparation of all wrapping material, taking into consideration the desirable qualities of each material and the purposes for which the bales are wrapped.

Although illustrative embodiments have been described herein in detail, its should be noted and understood that the descriptions and drawings have been provided for purposes of illustration only and that other variations both in form and detail can be added thereupon without departing from the spirit and scope of the invention. The terms and expressions have been used as terms of description and not terms of limitation. There is no limitation to use the terms or expressions to exclude any equivalents of features shown and described or portions thereof.

We claim:

1. An elongated wrapping material for wrapping items having a width and a circumference, comprising:
   a plurality of first and second discrete wrapping segments each having a width substantially equal to the width of an item and a length for covering at least a part of the circumference of the item;
   said plurality of first discrete wrapping segments and said plurality of second discrete wrapping segments disposed in a lengthwise direction relative to one another and joined along respective lateral ends in a widthwise direction, transverse to said lengthwise direction, forming said elongated wrapping material, one of said plurality of first discrete wrapping segments and said plurality of second discrete wrapping segments include a netting, the other of said plurality of first discrete wrapping segments and said plurality of second discrete wrapping segments include a breathable polymeric sheet that allows water vapor to escape while preventing condensation and moisture from penetrating into a wrapped item.

2. The elongated wrapping material of claim 1, wherein each said second discrete wrapping segment is joined to itself during the wrapping process.

3. The elongated wrapping material of claim 1, wherein each said first discrete wrapping segment and each said second discrete wrapping segment have different lengths and at least one of said first and second discrete wrapping segments has a length that is greater than the circumference of the item being wrapped.

4. The elongated wrapping material of claim 1, where said item to be wrapped comprises a pallet, hay, straw, cotton, silage or garbage.

5. The elongated wrapping material of claim 1, wherein each discrete wrapping segment has a sufficient width and length to cover at least part of the circumference of the item being wrapped.

6. The elongated wrapping material of claim 1, wherein each said discrete wrapping segments are joined at their respective ends by overlapping an end of one discrete wrapping segment with an end of another discrete wrapping segment.

7. The elongated wrapping material of claim 1, wherein said elongated wrapping material is formed into a roll.

8. An elongated wrapping material for wrapping items having a width and a circumference, comprising:
   a plurality of first, second, and third discrete wrapping segments each having a width substantially equal to the width of an item and a length for covering at least a part of the circumference of the item;
   said plurality of first discrete wrapping segments, said plurality of second discrete wrapping segments, and said plurality of third discrete wrapping segments disposed in a lengthwise direction relative to one another and joined along respective lateral ends in a widthwise direction, transverse to said lengthwise direction, forming said elongated wrapping material, at least one of said plurality of first, second, or third discrete wrapping segments includes a netting, another of said plurality of first, second, and third discrete wrapping segments include a breathable polymeric sheet that allows water vapor to escape while preventing condensation and moisture from penetrating into a wrapped item.

9. The elongated wrapping material of claim 8, wherein each said first discrete wrapping segment, said second discrete wrapping segment, and said third discrete wrapping segment have different lengths wherein at least one of said first, second, and third discrete wrapping segments has a length greater than the circumference of the item being wrapped.

10. The elongated wrapping material of claim 8, wherein at least one of said first, second, and third discrete wrapping segments has a length that is less than the circumference of the item being wrapped.

11. The elongated wrapping material of claim 8, wherein said item to be wrapped comprises a pallet, hay, straw, cotton, silage or garbage.

12. The elongated wrapping material of claim 8, wherein each discrete wrapping segment has a sufficient width and length to cover at least part of the circumference of the item being wrapped.

13. The elongated wrapping material of claim 8, wherein each said discrete wrapping segments are joined at their respective ends by overlapping an end of one discrete wrapping segment with an end of another discrete wrapping segment.

14. The elongated wrapping material of claim 8, wherein said elongated wrapping material is formed into a roll.

15. An elongated wrapping material for wrapping an item having a width and a circumference, comprising:

a plurality of discrete wrapping segments for covering the circumference of the item, wherein said plurality of discrete wrapping segments disposed in a lengthwise direction relative to one another and joined along respective lateral ends in a widthwise direction, transverse to said lengthwise direction, forming a continuous wrapping material, at least one of the discrete wrapping segments includes a netting and a breathable polymeric sheet, which allows water vapor to escape while preventing condensation and moisture from penetrating into a wrapped item.

16. The elongated wrapping material of claim 15, wherein at least two discrete wrapping segments of said plurality of discrete wrapping segments are joined to one another during the wrapping process.

17. The elongated wrapping material of claim 15, wherein the item to be wrapped comprises a pallet, hay, straw, cotton, silage or garbage.

* * * * *